Patented Nov. 28, 1944

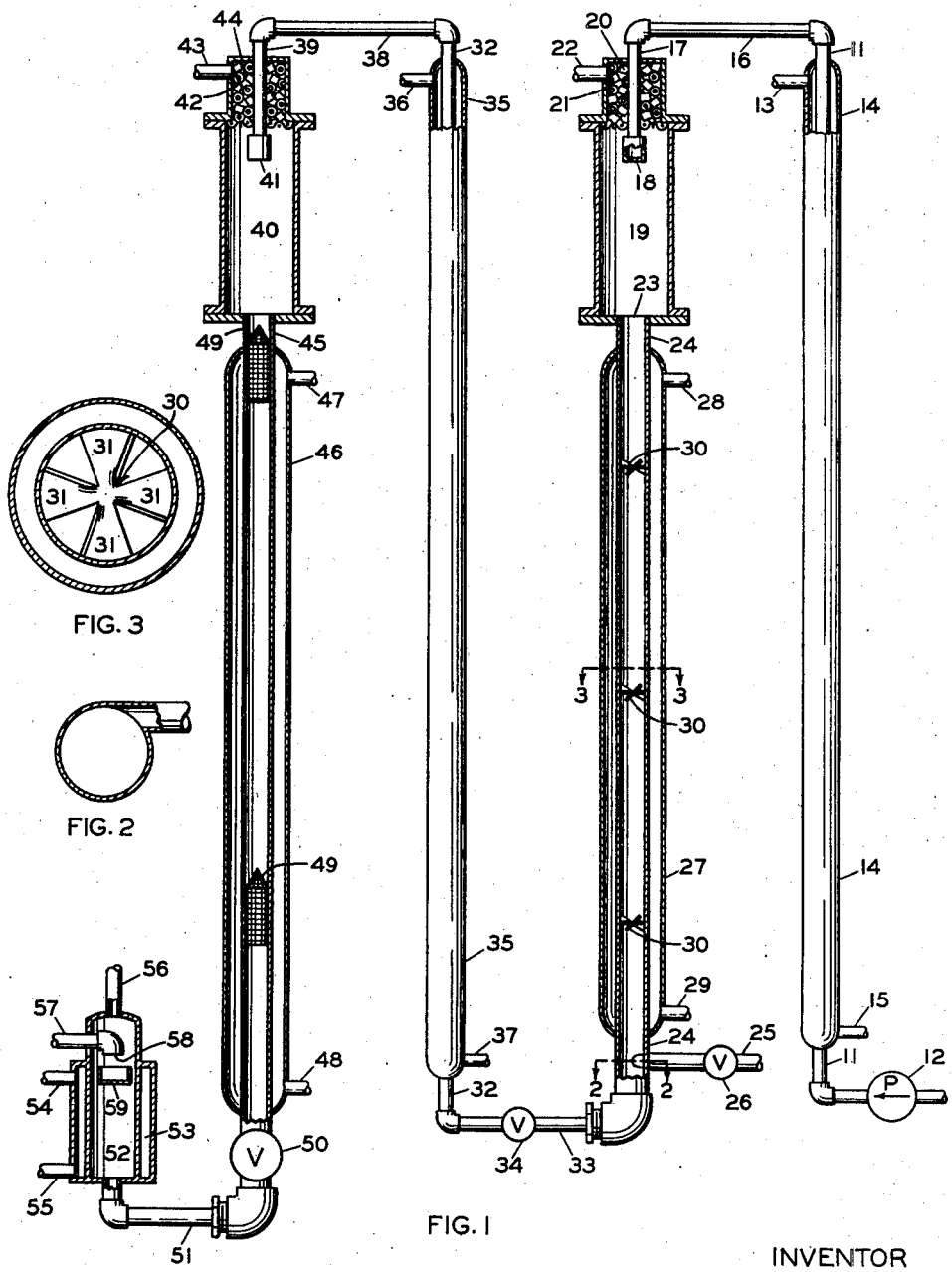

2,363,692

UNITED STATES PATENT OFFICE 2,363,692

PRODUCTION OF ROSIN AND TURPENTINE

Jesse O. Reed, Washington, D. C., assignor to Claude R. Wickard, as Secretary of Agriculture of the United States of America, and his successors in office Application November 26, 1941, Serial No. 420,540

1 Claim. (Cl. 202—152)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the production of rosin and turpentine from crude oleoresin.

Heretofore, the conventional practice in treating crude oleoresin for the production of rosin and turpentine comprised distilling the oleoresin by batches in heated vessels or stills into which steam or water was admitted to carry over the turpentine at low temperatures. At approximately 210° F. the turpentine begins to distill from the oleoresin, and the distillation is usually completed at about 315° F., the material remaining in the vessel being rosin. By this process, approximately two parts of water, as steam, are required to distill three parts of turpentine initially. As the distillation continues, more and more steam is required until at the end about 19 parts of water, as steam, are required to distill one part of turpentine. The use of the batch method, therefore, requires large quantities of heat and, furthermore, as the distillation proceeds, the composition of the turpentine changes, due to the fact that the conditions of distillation are not constant throughout with respect to temperature and the composition of the materials in the still.

The general object of this invention is the provision of a process and apparatus for manufacturing turpentine and rosin from oleoresin which will result in the production of turpentine and rosin having uniform compositions and which will not require excessive amounts of steam to distill the turpentine thereby reducing the amount of required heat.

A further object of this invention is to provide a method of the type mentioned by virtue of which the materials are not subjected to prolonged heating, as in the batch process. Such prolonged heating adversely influences the grade of the rosin produced.

To accomplish these objectives, I have provided means whereby the turpentine can be distilled in a continuous process, rather than in batches, and such that the conditions of distillation can be maintained substantially constant without prolonged heating, resulting in a uniform composition of both turpentine and rosin.

In the accompanying drawing, there is illustrated a preferred embodiment of an apparatus for carrying out the process of my invention and considered together with the following description a full understanding of my invention may be had by those skilled in the art.

In the drawing referred to:

Figure 1 is a diagrammatic elevational view of a preferred embodiment of the apparatus of my invention, partly in section.

Figure 2 is a section along the line 2—2 of Figure 1.

Figure 3 is a section along the line 3—3 of Figure 1.

Referring with more particularity to the drawing in which like numerals designate like parts, the apparatus illustrated comprises a vertical pipe 11 into the bottom of which filtered oleoresin is fed by a pump 12. As the oleoresin proceeds through the pipe 11, it is heated externally by steam admitted through an inlet 13 of a steam jacket 14 to a temperature exceeding the boiling point of the oleoresin, about 210° F. The outlet of the steam jacket 14 is designated by the numeral 15. Leaving the upper end of the pipe 11, the oleoresin is forced through pipes 16 and 17 to a liquid spray nozzle 18 in the upper part of a chamber 19. The upper end of the chamber 19, above the nozzle 18, contains packing 20, such as Raschig rings, and a vapor outlet 21 at the top is connected to a condenser (not shown) by means of a pipe 22. The lower end of chamber 19 has an outlet 23 connected to the top of a column 24. The hot oleoresin passing through the nozzle 18 is sprayed downwardly in finely divided form into the chamber 19. A pipe 25 is connected at the bottom of the column 24 for the introduction of steam under control of a valve 26. The connection between the pipe 25 and column 24 is made tangential to give the steam a whirling motion as it enters the bottom of the column and proceeds upward. The column 24 is also provided with a steam jacket 27 having an inlet 28 and an outlet 29. The whirling steam moves upward in the column 24 and contacts the oleoresin in the chamber 19 as it is sprayed downward from the nozzle 18 and vaporizes a large portion of the turpentine in the spray. The turpentine vapors then pass upward with the steam into the upper end of chamber 19 and out through the outlet 21 and pipe 22 into the condenser from whence the turpentine is separated from the condensate and recovered. The baffle effect of the packing 20 prevents nonvolatile materials from passing into the condenser through the pipe 22. The remaining part of the oleoresin falls under the action of gravity through the column 24 counter to the flow of the steam therethrough. Throughout the length of the column 24 baffles 30 having vanes 31 are secured at intervals. These vanes are shaped to give both the rising steam and the descending material a whirling motion. This produces an intimate contact between the steam and the oleoresin and, in addition, throws the descending material against the inner sides of the column by centrifugal force which is heated by the steam jacket, as a result of which substantially all of the remaining turpentine in the descending mass is vaporized and forced upward through the chamber 19 and out through the outlet 21, leaving the non-volatile material to collect at the bottom of column 24 and flow into the bottom of a vertical pipe 32 through a connecting pipe 33, the flow being controlled by the valve 34 in said pipe 33. The pipe 32 is also provided with a steam jacket 35 having a steam inlet 36 and outlet 37.

The material entering the pipe 32 at the bottom is substantially free of turpentine and consists essentially of rosin and water. If the rosin were recovered at this point, the water contained therein would upon cooling of the rosin cause it to become opaque, which is undesirable. Such rosin is ordinarily unmarketable. Consequently, in order to obtain a clear marketable rosin, it is necessary to free the material of this water. This is accomplished in the subsequent steps of the process. The water-containing rosin as it flows upward through the pipe 32 is kept in a fluid state by heat from the steam jacket 35. This heat also vaporizes the water in the mass and any traces of turpentine which might remain. These vapors force the rosin upward in the pipe 32 through a connecting pipe 38 at the top, and thence through a downwardly extending pipe 39 which terminates in the upper part of an expansion chamber 40, similar to the chamber 19. The lower end of the pipe 39 is also provided with a liquid spray nozzle 41, similar to the nozzle 18, and at the top of the chamber 40 a vapor outlet 42 is similarly provided which is connected by a pipe 43 to a second condenser (not shown). The upper part of the chamber 40 is likewise provided with packing material 44 like that in the chamber 19 and for the same purpose. As the rosin passes through the pipes 38 and 39, it is forced through the spray nozzle 41. The steam associated with the rosin and any turpentine vapors formed are immediately released, rise and pass into the second condenser through the outlet 42 and pipe 43. The bottom of the chamber 40 is connected to the top of a column 45 which is kept hot by a steam jacket 46 having an inlet 47 and outlet 48. The rosin falling from the nozzle 41 collects in the bottom of the chamber 40 and passes downward through the column 45. Should any turpentine or moisture remain in the rosin as it proceeds down through the column 45, it is vaporized by heat from the steam in the jacket 46. In order to increase the effectiveness of this action, it is preferred to have the material flowing downward in the column 45 as close to the steam jacket as possible. To accomplish this, conical shaped screens 49 of wire, or any other suitable material, are secured at intervals in the column 45 which function to retard the flow of the rosin so as to permit it to absorb more heat as it passes through the column and, at the same time, placing it into contact with the hottest part of the column, leaving sufficient opening for the upward passage of vapors through the column. The use of such screens, however, is not indispensable, and other satisfactory means may be used. For example, baffles, such as the ones shown in column 24, may be employed to impart a whirling motion. Such baffles may be used either in substitution of the conical screens 49 or in conjunction with them.

The anhydrous and turpentine-free rosin collects at the bottom of the column 45. From this point the flow is controlled by a valve 50 from which the rosin passes through a pipe 51 into the bottom of a chamber 52. The chamber 52 is provided with a steam jacket 53 having an inlet 54 and outlet 55 to keep the rosin in a fluid state. The upper end of the chamber 52 is provided with a vent 56 so that any free water, which may be carried into the chamber 52, will be immediately distilled off by the excess heat of the rosin, which at this point may be as high as 330° F. The rosin collecting in the chamber 52 is discharged through a pipe 57 which is disposed through the side of the chamber 52, the intake opening 58 extending downward in the direction opposite the vent 56. To prevent steam, rising off the bottom of the chamber 52, from entering the inlet 58, a baffle 59 is provided below the outlet 58. Rising steam passes around the baffle 59 and by-passes the outlet 58, from whence it proceeds out through the vent 56 while the fluid rosin is forced into the inlet 58 and through the pipe 57, from whence it is recovered in an anhydrous condition ready for marketing.

Having thus described my invention, I claim:

A distillation apparatus comprising a conduit, a chamber, packing material at the top of said chamber, a spray nozzle in said chamber below said packing material, said nozzle being connected to one end of said conduit, said chamber having an outlet at the top, a column having a free vertical space and having its upper end connected to the bottom of said chamber, means for rotationally introducing steam into the bottom of said column, means for causing steam rising in said column to whirl, a second conduit having one end connected to the bottom of said column, a second chamber, packing material at the top of said second chamber, a nozzle in said second chamber below the packing material therein, said second chamber having an outlet at the top, said nozzle being connected to the other end of said second conduit, a second column having a free vertical space and having its upper end connected to the bottom of said second chamber, baffles in said second column for forcing descending material outwardly, a receptacle, the bottom of said receptacle being connected to the bottom of said second column, said receptacle having a vent at the top and a downwardly facing outlet below said vent, and a baffle below said outlet to by-pass vapors around said outlet, and means for externally heating said conduits, columns, and said receptacle.

JESSE O. REED.